United States Patent [19]
Farley et al.

[11] Patent Number: 5,695,197
[45] Date of Patent: Dec. 9, 1997

[54] SEAL RING METHOD OF SEALING AND MOLDING COMPOSITION COMPRISING BLEND OF PTFE COPOLYMER, POLYAMIDE AND CARBON FIBER THEREFOR

[76] Inventors: Michael L. Farley, 801 Mill St., S. Elgin, Ill. 60177; George H. Johnson, 174 N. Dubois, Elgin, Ill. 60123

[21] Appl. No.: 764,831

[22] Filed: Dec. 6, 1996

[51] Int. Cl.$^6$ .................................................. F16J 9/26
[52] U.S. Cl. ........................... 277/1; 277/DIG. 6; 525/200
[58] Field of Search ..................... 277/1, 227, DIG. 6; 525/199, 200; 428/422; 526/247

[56] References Cited

U.S. PATENT DOCUMENTS

| | | |
|---|---|---|
| 3,027,626 | 4/1962 | Murphy. |
| 3,303,565 | 2/1967 | Newman. |
| 3,504,438 | 4/1970 | Wittman et al.. |
| 3,644,593 | 2/1972 | Nowak et al.. |
| 3,655,611 | 4/1972 | Mueller et al.. |
| 3,808,130 | 4/1974 | Schlefer et al.. |
| 3,962,373 | 6/1976 | Petrucelli. |
| 4,050,156 | 9/1977 | Chasanoff et al.. |
| 4,252,859 | 2/1981 | Concannon et al. ............ 525/200 |
| 4,655,945 | 4/1987 | Basells. |
| 4,749,752 | 6/1988 | Youlu et al.. |
| 4,904,726 | 2/1990 | Morgan et al. ................ 525/200 |
| 4,952,630 | 8/1990 | Morgan et al. ................ 525/200 |
| 5,051,479 | 9/1991 | Logothetis et al. ............ 525/200 |
| 5,112,901 | 5/1992 | Buchert et al.. |
| 5,163,692 | 11/1992 | Schofield et al.. |
| 5,168,895 | 12/1992 | Voss. |
| 5,173,188 | 12/1992 | Winter et al.. |
| 5,271,679 | 12/1993 | Yamazumi et al.. |
| 5,272,186 | 12/1993 | Jones ........................... 525/199 |
| 5,317,061 | 5/1994 | Chu et al. ..................... 525/200 |
| 5,560,986 | 10/1996 | Mortimer, Jr. ................. 525/200 |

FOREIGN PATENT DOCUMENTS

| | | |
|---|---|---|
| 1322747 | 10/1993 | Canada. |
| 61-31442 | 2/1986 | Japan. |
| 3-121135 | 5/1991 | Japan. |
| 1658636 | 7/1992 | Japan. |
| 5-239440 | 9/1993 | Japan. |
| 5-262976 | 10/1993 | Japan. |
| 5-320505 | 12/1993 | Japan. |
| 6-129538 | 5/1994 | Japan. |
| 1166253 | 10/1969 | United Kingdom. |

OTHER PUBLICATIONS

Article entitled Wear Characteristics of Fluropolymer Composites by Barry Arkles, Stephen Gerakaris and Richard Goodue of Liquid Nitrogen Processing Corporation dated Feb., 1994.

Paper No. 7 of J. C. Hodge of Railko, Ltd. entitled Reinforced Thermoset Bearings dated Feb. 21, 1973.

Article entitled Pitch Based Carbon Fiber for General Purpose Donacarbo of Donac Co., Ltd.

Article entitled Modified PTFE Suspension Polymers by T.E. Andres, Dr. M.Schlipf, and R. Speli, 1995.

Article of Carborundum Company entitled Ekonol PTFE Blends; Form No. A-10002 dated Feb., 1974.

Primary Examiner—Scott Cummings
Attorney, Agent, or Firm—John A. Molnar, Jr. Esq.

[57] ABSTRACT

A set for preventing flow of a fluid under pressure between a first surface and a second surface spaced-apart from the first surface. The seal is molded or otherwise formed from a composition comprising a blend of from about 79–87% by weight of a copolymer of polytetrafluoroethylene and perfluoropropylene vinyl ether, from about 10–14% by weight of polyimide, and from about 3–7% by weight of carbon fiber. The seal is interposable between the first and second surface effective to prevent the flow of the fluid therethrough.

21 Claims, 1 Drawing Sheet

SEAL RING METHOD OF SEALING AND MOLDING COMPOSITION COMPRISING BLEND OF PTFE COPOLYMER, POLYAMIDE AND CARBON FIBER THEREFOR

BACKGROUND OF THE INVENTION

The present invention relates broadly to a composite material for use in the molding of seal rings and the like having controlled deformation, elongation, and wear resistance properties.

Spurred by consumer demand and regulatory measures, automotive manufacturers have continued a trend toward producing more fuel efficient cars and trucks. In this regard, lighter-weight materials, especially aluminum and alloys thereof, are being substituted whenever possible for heavier materials such as steel. Although such substitutions have resulted in cars which are increasingly lighter and fuel efficient, fabrication with the lighter weight materials has continued to frustrate systems suppliers to the automotive industry. In particular, parts formed of materials such as aluminum and aluminum alloys are relatively softer as compared to counterparts formed of steel. Thus, when subject to rotary or linear movements, the bearing surfaces and housings of parts such as pistons and valves are susceptible to excessive wear.

In power steering systems of cars and trucks, for example, fluid pressure is admitted to various system components through the ports of valves and the like which are spooled within corresponding housings. Typically, such valves include a piston head which is axially reciprocated and/or rotated radially within an internal bore of a valve housing or body. The piston head, which is formed as having an outer circumferential surface, and bore are sized to provide a predetermined clearance therebetween accommodating for the movement of the piston head. For preventing fluid leakage between the piston head and the housing, the outer surface of the piston head conventionally is provided as including a circumferential groove within which a generally annular seal is mounted. The seal ring, which conventionally is formed of a polytetrafluoroethylene (PTFE) material, is compressed radially between the outer surface of the piston head and the inner surface of the cylinder bore to effect a fluid sealing engagement therebetween.

It has been observed, however, that seal rings of the type herein involved are subject to axial and other forces which can cause the ring to deform and extrude into the space between the outer surface of the piston head and the inner wall of the cylinder bore. Such deformation ultimately affects the fluid integrity of the seal and is to be avoided for acceptable long-term performance. Attempts have been made to control this deformation by adding reinforcements such as glass fiber, carbon fiber, and graphite to the PTFE matrix, but often at the sacrifice of the elongation at break percentage necessary to install the gasket over the piston head or the like without breakage. Moreover, and especially with respect to the lighter and softer aluminum and aluminum alloy materials presently favored for automotive applications, the PTFE-based seal materials and composites heretofore known in the art have been observed to cause excessive wear on bearing surfaces. Again, such wear jeopardizes the fluid integrity of the seal and ultimately results in leakage from the valve or other part.

Japanese Patent No. 1,658,636 describes a composite material for use in the molding of seals and bearing parts which is formed from a combination, by weight, of 55–89% PTFE resin powder, 10–35% of a heat resisting polyoxybenzoyl polyester resin powder, and 1–10% carbon fiber powder. Japanese Patent No. 5,262,976 describes an oil cylinder formed of a resin composition, by weight, of: 10–40% powdered talc, calcium carbonate, or calcium sulfate distributed in 30–78% of a polyetheretherketone, polyethernitryl, polyetherketone, or all aromatic thermoplastic polyimide resin; 10–45% carbon fiber; and 2–25% ethylene tetrachloride. U.S. Pat. No. 5,168,895 discloses a sealing ring formed a modified PTFE material. U.S. Pat. No. 5,173,188 discloses a semi-hard stem seal formed of a temperature resistant-resistant thermosetting polyimide resin reinforced with carbon and internally lubricated with PTFE powder (Vespel™ type SP-211, E. I. du Pont de Nemours & Co., Inc., Wilmington, Del.). Japanese Patent No. 6,129,538 describes a sealing device formed of polyimide resin which is added to a matrix of PTFE resin and solid lubricating material. U.S. Pat. No. 3,808,130 describes a self-lubricating bearing prepared by admixing a perfluoroalkylene polymer such as PTFE with defined inorganic solid lubricants and epoxy resins followed by a cold molding technique and heating cycle. Canadian Patent No. 1,322,747 discloses a multi-layer sliding bearing having a metal base layer and a layer of a copolymer of perfluoroalkyl vinyl ether and PTFE applied directly on the base layer.

Although the above-described references have heretofore constituted the state of the art with respect to seals and compositions therefor, it will be appreciated that continued improvements in seals for use in applications with relatively light weight materials such as aluminum and aluminum alloys would be well-received by the automotive industry. A preferred seal and composition would represent a convergence of elongation percentage, wear resistance, and controlled deformation properties. Additionally, the preferred seal must be capable of withstanding prolonged exposure to hydrocarbons within rigorous service environments of high fluid temperatures and pressures.

BROAD STATEMENT OF THE INVENTION

The present invention is directed to a composite material and to rings, packings, and other seals and the like molded or otherwise formed therefrom which have controlled deformation, elongation, and wear resistance properties. The convergence of such properties makes the seals of the present invention especially adapted for applications involving relatively soft bearing surfaces which are otherwise susceptible to excessive wear from seals of other compositions.

It therefore is a feature of the present invention to provide a seal for preventing flow of a fluid under pressure between a first surface and a second surface spaced-apart from the first surface. The seal is interposable between the first and second surfaces, and is molded from a composition of a blend of from about 79–87% by weight of a copolymer of polytetrafluoroethylene and perfluoropropylene vinyl ether, from about 13–17% by weight of polyimide, and from about 3–7% by weight of carbon fiber.

It is a further feature of the invention to provide a method of preventing flow of a fluid under pressure between a first surface and a second surface spaced-apart from the first. A seal member is molded or otherwise formed from a composition of a blend of from about 79–87% by weight of a copolymer of polytetrafluoroethylene and perfluoropropylene vinyl ether, from about 13–17% by weight of polyimide, and from about 3–7% by weight of carbon fiber. The seal member then is interposed between the first and second surfaces effective to prevent the flow of the fluid therethrough.

It is yet a further feature of the invention to provide a moldable composition. The composition is a blend of from about 79–87% by weight of a copolymer of polytetrafluoroethylene and perfluoropropylene vinyl ether, from about 10–14% by weight of polyimide, and from about 3–7% by weight of carbon fiber.

Advantages of the present invention include the provision of a seal ring member which resists extrusion and other deformations, but which also does not cause excessive wear even on relatively soft bearing or mating surfaces. Additional advantages of the present invention include the provision of seals which exhibit elongation properties facilitating their mounting without breakage over piston heads or the like, and which are capable of withstanding prolonged exposure to hydrocarbons within rigorous service environments of high fluid temperatures and pressures. These and other advantages will be readily apparent to those skilled in the art based upon the disclosure contained herein.

BRIEF DESCRIPTION OF THE DRAWINGS

For a fuller understanding of the nature and objects of the invention, reference should be had to the following detailed description taken in connection with the accompanying drawings wherein.

DETAILED DESCRIPTION OF THE INVENTION

Figure 1:
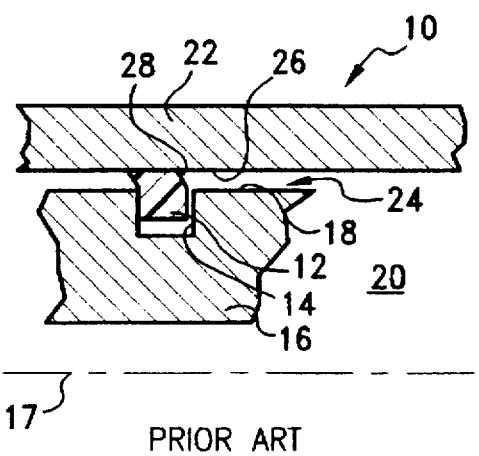
FIG. 1 is a cross-sectional, fragmentary view of a valve ring seal assembly according to the prior art wherein the seal ring thereof is shown as being extruded into a gap formed between a piston head and a cylinder bore of the assembly.

Referring to the figures wherein corresponding reference characters designate corresponding elements, a representative seal ring assembly according to the prior art is shown generally at 10 in FIG. 1. Assembly 10 includes a annular seal ring, 12, which is mounted within a circumferential groove, 14, of a piston head, 16, all of which are generally cylindrical and symmetrical about the axial center line represented at 17. Piston head 16, which is formed as having a cylindrical outer circumferential surface, 18, is configured for axial reciprocation and/or radial rotation within an internal bore, represented at 20, of a valve housing or body, 22. Piston head 16 and bore 20 are respectively sized to provide a predetermined clearance or gap, represented at 24, between outer surface 18 of piston head 16, and an inner surface, 26, of valve housing 22 bore 20. As used herein, the term "piston head" includes any member having an outer peripheral surface including, without limitation, a cylinder or valve spool.

Figure 2:
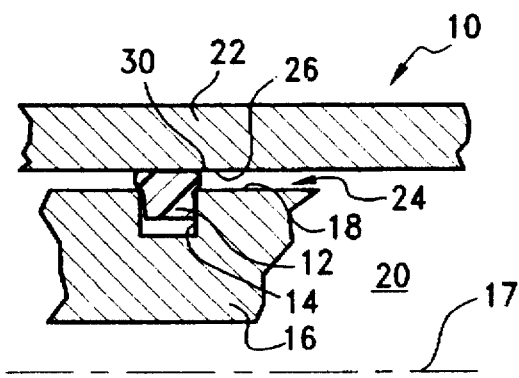
FIG. 2 is a cross-sectional, fragmentary view of a valve ring seal assembly according to the prior art wherein the seal ring thereof is shown as being deformed within a gap formed between a piston head and cylinder bore of the assembly.

Seal ring 12, which may be conventionally formed of a filled, polytetrafluoroethylene (PTFE) material or the like, is compressed radially between surfaces 18 and 26 for effecting a fluid sealing engagement therebetween. In such an arrangement, seal ring 12 is subject to certain axial forces developed from the movement of piston head 16 within bore 20. Over time, these forces have been observed to deform ring 12 to an extent that a portion thereof, represented at 28, is extruded into gap 24. The extent of such extrusion is related to the deformation under load and other material properties of the composition forming seal 12. The deformation of seal 12 also may be manifested as is shown at 30 in FIG. 2. In both instances, the fluid integrity of the seal ultimately may be comprised.

Figure 3:
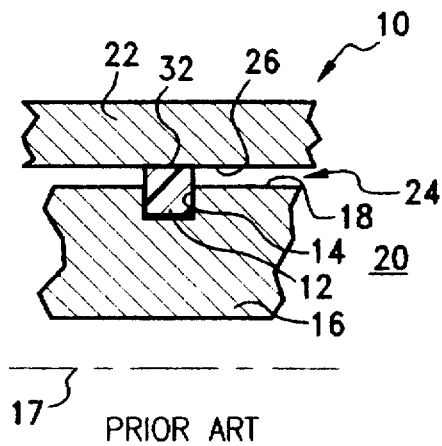
FIG. 3 is a cross-sectional, fragmentary view of valve ring seal assembly according to the prior art which is shown as exhibiting excessive wear on the interior wall of a cylinder bore of the assembly.
Figure 4:
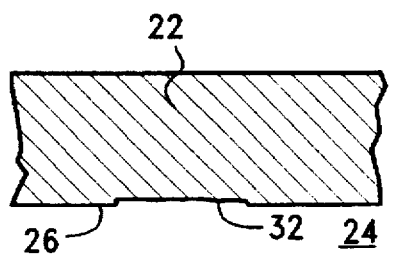
FIG. 4 is a cross-sectional, fragmentary view showing the interior wall of the cylinder bore of FIG. 3 in enhanced detail.

In response to the relatively poor deformation under load performance of the PTFE seals heretofore known in the art, formulators typically have sought to increase the level of filler, which may be glass or carbon fiber, or to select matrix resins which are harder than conventional PTFE. Any improvement in deformation under load properties, however, heretofore has been at the sacrifice of the elongation at break percentage necessary to install the seals or gaskets formed thereof without breakage. Moreover, and especially with respect to lighter materials of constructions such as aluminum and aluminum alloys, the PTFE seals of conventional composition have been observed to cause excessive wear on mating surfaces. Such wear is graphically illustrated in FIG. 3 at 32, and in greater detail in FIG. 4, wherein inner surface 26 of cylinder housing 22 is shown as having developed surface asperities indicative of excessive wear from the bearing of seal 13 thereon. Again, over time, the fluid integrity of the seal ultimately may be comprised.

Thus, the convergence of controlled deformation, elongation, and wear resistance properties which would be desired in a PTFE-based seal preferred for applications involving soft bearing surfaces of aluminum and the like, has heretofore eluded formulators of seal ring compositions. It has been discovered unexpectedly, however, that a blend of from about 79–87% by weight of a copolymer of PTFE and perfluoropropylene vinyl ether (PPVE), from about 10–14% by weight of polyimide, and from about 3–7% by weight of carbon fiber affords a molding composition which exhibits the preferred properties. Seal rings molded from such composition have been found to be especially adapted for use in assemblies wherein mating surfaces thereof would otherwise be susceptible to excessive wear from seals of conventional composition. A preferred formulation of the seal ring molding composition of the present invention consists of about 83% by weight of PPVE-modified PTFE, about 12% by weight polyimide, and about 5% by weight carbon fiber.

The copolymer of the seal ring composition of the present invention preferably is PTFE modified with about 0.1% by weight PPVE which is added during polymerization. The addition of the PPVE co-monomer has been observed to effect a reduction of the molecular weight of the copolymer, but without a corresponding increase in crystallization. The lower molecular weight of the copolymer enables chain branching with a greater volume percentage of amorphous region. The increased amorphous phase and chain branching have been observed to enhance thermo-mechanical performance of the copolymer. Copolymers of the preferred type are sold commercially under the name HOSTAFLON® TFM 1700 by Hoechst Celanese Corp., Chatham, N.J. Such copolymers are known to exhibit exceptional chemical resistance and to have elongations at break of over 600% which make them especially attractive in seal and gasket applications. However, as with PTFE-based materials in generally, their tensile strength, wear resistance, and creep resistance are low as compared to other engineering thermoplastics.

Without further compounding, therefore, a seal ring molding composition of the above-described PPVE-modified PTFE would not be expected to exhibit acceptable creep deformation within the relatively rigorous environment of elevated temperature and pressure to which seals and gaskets are typically exposed. Accordingly, to the modified PTFE matrix is added from between about 10–14% of a thermoplastic polyimide. The preferred polyimide is produced by the polycondensation reaction of an aromatic dianhydride and an aromatic diamine, and has been sold commercially by Lenzing USA Corp., Dallas, Tex., under the trade designation P84. Polyimides of the type herein involved are known to exhibit outstanding high temperature resistance, toughness, and high resistance to deformation under load at elevated temperatures. However, as such materials posses elongations of only about 7–10%, blending with the modified PTFE of the present invention advantageously yields a composition having an elongation of at least about 50% which is acceptable for most seal ring applications.

Additionally added to the modified PTFE matrix is a filler or reinforcement of from about 3–7% by weight of carbon fiber. The addition of the carbon fiber filler improves the deformation and wear resistance of the composition without promoting excessive wear on bearing surfaces, and without decreasing the tensile strength and elongation percentage of to an extent which would affect the performance of the composition in seal ring applications. The carbon fiber filler, which may be pitch or polyacrylonitrile (PAN)-based, may be provided as chopped or milled carbon or graphite-grade fibers having a diameter of about 0.013 mm and length of about less than 1 mm. A fiber length of from about 0.10–0.70 mm, however, is considered to be preferred. A pitch-based filler of the preferred type is marketed commercially under the name DONACARBO® SG 241, by Donac Co., Ltd., Japan.

Formulated as described, the molding composition of the present invention therefore will be appreciated to represent a synergistic convergence of physical properties, such as elongation percentage, controlled deformation, and wear resistance which hereto had not been available in the art. The constituents of the inventive composition may be blended into a homogeneous mixture. Alternatively, the constituents may be agglomerated into granules using dry or wet mixing techniques. For example, the components may be pre-blended in a tumble mixer, and then milled. If a free-flowing material is desired for automatic molding processing or the like, the blended components may be dispersed in a wetting solution which is evaporated at a temperature of about 300° C. (575° F.) to pelletize the material into particles which are passable through about an 18 mesh screen.

For its processing into a seal ring of a generally annular configuration, the blended composition may be formed into a generally tubular sleeve pre-form of a select inner and outer diameter. In this regard, conventional automatic or other compression molding techniques by be used to consolidate the material under a pressure of from about 6,000–24,000 psi. The pressure may be held for a dwell time of from about 6–12 seconds to ensure uniform pressure transmission though the sleeve pre-form. Following compression, the "green" pre-form may be sintered in a conveyor or batch oven at a temperature of about 370° C. (700° F.) for about 90 minutes. The heat treating conditions are selected to control the crystallinity of the material for providing sufficient hysteresis or "snap-back" properties in the material.

Figure 5:
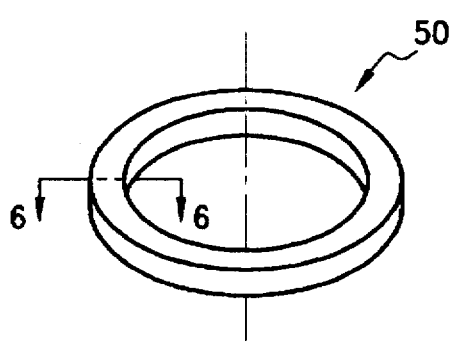
FIG. 5 is a perspective view of a representative valve ring seal fabricated in accordance with the precepts of the present invention.
Figure 6:
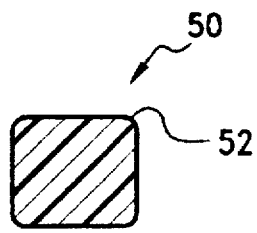
FIG. 6 is a cross-sectional view of the valve ring seal of FIG. 5 taken through line 6—6 of FIG. 5, which line is perpendicular to the longitudinal axis of the seal. The drawings will be described further in connection with the following Detailed Description of the Invention.

The sintered sleeve so formed may be lathe cut into seal rings, a representative one of which is shown at 50 in FIG. 5, which then may be double-disk ground to a precise thickness or axial width. For example, seal 50 may be formed as having a radial cross-section of about 1.5 mm, an outer diameter of about 36 mm, and a thickness or axial width of about 1.9 mm. As is shown at 52 in FIG. 6, wherein seal 50 is depicted in cross-section, the edges of seal 50 preferably are radiused to relieve any stress concentrations thereat. In this regard, seal 50 may be slurry tumbled to round the edges thereof to the desired radius. As an alternative to the above-described "sleeve and slice" forming operation compression molding technique, seal 50 may be manufactured as a net molded part. Also, other cross-sectional configurations for seal 50 alternatively may be envisioned, such as circular or O-ring, U-shaped, V-shaped, or any other desired shape.

Seal 50 may be used to prevent the flow of fluid under pressure from between a first surface and a second surface spaced-apart from the second surface. In this regard, seal 50 may be mounted onto a component, such as piston head 16 of FIG. 1. The use of a tapered installation cone has been found to facilitate the mounting of seal 50 about a component such as piston head 16. It has been observed that a seal fabricated substantially as has been detailed hereinbefore exhibits sufficient hysteresis or "snap-back" such that it may retained within, for example, groove 14 of piston head 16. In contrast, other PTFE-based seal compositions lacking the convergence of physical properties of the composition of the present composition have been observed to exhibit inelastic deformation during installation. Such deformation both interferes with the assembly of the parts, and also compromises the fluid integrity of the assemblage.

The following Examples are illustrative of the precepts of the present invention, but should not be construed in any limiting sense.

EXAMPLES

Example 1

In order to confirm the precepts of the present invention, a seal ring molding composition in accordance therewith was prepared. In this regard, a master batch of the inventive composition was prepared by pre-blending about 83% by weight of a PTFE/PPVE copolymer (PTFE modified with about 0.1 wt % PPVE, HOSTAFLON® TFM 1700, Hoechst Celanese Corp., Chatham, N.J.), about 12% by weight of polyimide (polycondensed aromatic dianhydride and aromatic diamine, Lenzing USA Corp., Dallas, Tex.), and about 5% by weight of a milled, pitch-based carbon fiber having a fiber length of less than about 1 mm (DONACARBO® SG 241, by Donac Co., Ltd., Japan). The material was tumbled and milled into a homogeneous mixture, and then compression molded and sintered into sheet stock. Sample coupons prepared from the sheet stock were subject to physical testing, the results of which are summarized in Table 1.

TABLE 1

Summary of Physical Properties

| Tested Property | Test Method | Experimental Result |
| --- | --- | --- |
| Tensile Strength | JIS K6891 | 106.7 kg/cm$^2$ |
| Elongation | JIS K6892 | 60.5% |
| Durometer Hardness | ASTM D2240 | 60 Shore D |
| Specific Gravity | ASTM D792-86 | 1.86 |
| Constant Load Deformation | IF-772A03A[1] | 0.092% |
| Surface Roughness (1.0 mm Rz) | IF-772A05A[1] | 11.62 μm (O.D.) 10.55 μm (side) |
| Heat Expansion Coefficient | ASTM E831-86 | 10.3 × 10$^{-5}$ mm/°C. (vertical) 14.6 × 10$^{-5}$ mm/°C. (parallel) |

[1]Koyo Seiko Co. Engr. Spec.

These results confirm the advantageous convergence of physical properties, including controlled deformation, elongation, and wear resistance, exhibited by the composite material of the present invention.

Example 2

Representative seals were molded for physical testing from the composition of the present invention compounded as was described in connection with Example 1. The composition was compression molded into a generally tubular pre-form, which then was sintered and sectioned into O-rings having an axial width of about 1.9 mm and an inner diameter of about 34 mm. The O-rings were mounted for elongation and tensile testing, and pulled under a load rate of 50 mm/min. Both the load and elongation at break were measured, with the following results being recorded.

TABLE 2

O-Ring Tensile-Elongation Data

| Sample No. | Load (kg) | Area (mm$^2$) | Tensile Strength (kg/mm$^2$) | Elongation (mm) | Elongation (%) |
| --- | --- | --- | --- | --- | --- |
| 1 | 6.22 | 5.70 | 1.0912 | 9.00 | 83.44 |
| 2 | 6.19 | 5.70 | 1.0890 | 44.00 | 73.91 |
| 3 | 6.27 | 5.70 | 1.1000 | 54.00 | 92.97 |
| 4 | 6.09 | 5.70 | 1.0684 | 37.00 | 60.57 |
| 5 | 6.21 | 5.70 | 1.0895 | 41.50 | 69.14 |
| 6 | 6.39 | 5.70 | 1.211 | 39.00 | 64.38 |
| Average | 6.23 | 5.70 | 1.0927 | 44.08 | 74.07 |

The above-tabulated results confirm that the O-ring seals of the present invention exhibit sufficient hysteresis so as to be mountable, for example, within a circumferential groove of a piston head or the like.

Example 3

O-ring seals fabricated as was described in connection with Example 2 were exposed to a hydrocarbon fluid, viz., power steering fluid/oil, for service environment testing. The seals were immersed in two representative types of oil, and the change in selected physical properties was determined as a function of immersion time. The results are summarized in Table 3.

TABLE 3

Effect of Oil Immersion on Select Physical Properties

| Immersion (hours) | Tensile Strength (% change) | | Elongation (% change) | | Durometer (points change) | | Volume Expansion (% change) | |
| --- | --- | --- | --- | --- | --- | --- | --- | --- |
| | Type 1[a] | Type 2[a] | Type 1 | Type 2 | Type 1 | Type 2 | Type 1 | Type 2 |
| 0 | 0.0 | 0.0 | 0.0 | 0.0 | 0 | 0 | 0.00 | 0.00 |
| 70 | −12.5 | 4.0 | −21.7 | −17.7 | −1 | −2 | 0.19 | 0.38 |
| 140 | −3.6 | 4.0 | −15.5 | −25.8 | −1 | −2 | 0.36 | 0.24 |
| 300 | −6.3 | 3.0 | −10.0 | −12.9 | −1 | −2 | 0.47 | 0.22 |
| 500 | −12.5 | −3.0 | 1.7 | −4.8 | −2 | −5 | 0.30 | 0.14 |
| 1000 | −10.7 | 0.0 | −23.8 | −27.4 | −4 | −5 | 0.20 | 0.10 |

[a]Exxon-Type oil
[b]Nissan-Type oil

The results confirm that the seals of the present invention are capable of withstanding prolonged exposure to hydrocarbons.

As it is anticipated that certain changes may be made in the present invention without departing from the precepts herein involved, it is intended that all matter contained in the foregoing description shall be interpreted as illustrative and not in a limiting sense. All references cited herein are expressly incorporated by reference.

What is claimed:

1. A seal for preventing flow of a fluid under pressure between a first surface and a second surface spaced-apart from said first surface, said seal being interposable between said first and second surface and being formed from a composition comprising a blend of from about 79–87% by weight of a copolymer of polytetrafluoroethylene and perfluoropropylene vinyl ether, from about 10–14% by weight of polyimide, and from about 3–7% by weight of carbon fiber.

2. The seal of claim 1 wherein said first surface defines a generally cylindrical bore, and said second surface defines a generally cylindrical member received within the bore, said seal being formed as a generally annular.

3. The seal of claim 2 wherein said cylindrical member is movable within said bore.

4. The seal of claim 1 wherein said composition consists essentially of about 83% by weight of said copolymer, about 12% by weight of said polyimide, and about 5% by weight of said carbon fiber.

5. The seal of claim 1 having an elongation percentage of at least about 50%.

6. The seal of claim 1 wherein said first surface is formed of aluminum or an alloy thereof.

7. The seal of claim 1 wherein said copolymer comprises about 0.1% by weight of perfluoropropylene vinyl ether.

8. The seal of claim 1 wherein said carbon fiber has a length of less than about 1 mm.

9. A method of preventing flow of a fluid under pressure between a first surface and a second surface spaced-apart from said first surface comprising the steps of:

(a) forming a seal member from a composition comprising a blend of from about 79–87% by weight of a copolymer of polytetrafluoroethylene and perfluoropropylene vinyl ether, from about 10–14% by weight of polyimide, and from about 3–7% by weight of carbon fiber; and (b) interposing said seal member between said first and said second surface effective to prevent the flow of said fluid therethrough.

10. The method of claim 9 wherein said first surface defines a generally cylindrical bore, and said second surface defines a generally cylindrical member received within the bore, said seal being formed as a generally annular member.

11. The method of claim 10 wherein said cylindrical member is movable within said bore.

12. The method of claim 9 wherein said composition of step (b) consists essentially of about 83% by weight of said copolymer, about 12% by weight of said polyimide, and about 5% by weight of said carbon fiber.

13. The method of claim 9 wherein said seal molded in step (b) has an elongation percentage of at least about 50%.

14. The method of claim 9 wherein said first surface is formed of aluminum or an alloy thereof.

15. The method of claim 9 wherein said copolymer comprises about 0.1% by weight of perfluoropropylene vinyl ether.

16. The method of claim 9 wherein said carbon fiber has a length of less than about 1 mm.

17. A moldable composition comprising a blend of from about 79–87% by weight of a copolymer of polytetrafluoroethylene and perfluoropropylene vinyl ether, from about 10–14% by weight of polyimide, and from about 3–7% by weight of carbon fiber.

18. The composition of claim 17 comprising about 83% by weight of said copolymer, about 12% by weight of said polyimide, and about 5% by weight of said carbon fiber.

19. The composition of claim 17 having an elongation percentage of at least about 50% when molded.

20. The composition of claim 17 wherein said copolymer comprises about 0.1% by weight of perfluoropropylene vinyl ether.

21. The composition of claim 17 wherein said carbon fiber has a length of less than about 1 mm.

* * * * *